United States Patent [19]

Salway-Waller et al.

[11] 4,205,210

[45] May 27, 1980

[54] HIGH FREQUENCY CAVITY PRESS

[75] Inventors: Malcolm Salway-Waller, Rowley Fields; Frederick H. Langton, Groby, both of England

[73] Assignee: USM Corporation, Farmington, Conn.

[21] Appl. No.: 866,934

[22] Filed: Jan. 4, 1978

Related U.S. Application Data

[63] Continuation-in-part of Ser. No. 767,773, Feb. 11, 1977, abandoned, which is a continuation of Ser. No. 638,331, Dec. 8, 1975, abandoned.

[30] Foreign Application Priority Data

Dec. 20, 1974 [GB] United Kingdom ............... 55256/74

[51] Int. Cl.$^2$ ........................ H05B 9/04; B29C 27/04; C09J 5/06

[52] U.S. Cl. .............................. 219/10.81; 219/10.77; 156/273; 331/186; 331/177 R; 318/650; 323/45

[58] Field of Search ................ 156/273, 380; 331/101, 331/96, 177 R, 186; 323/39, 45, 43.5; 318/650; 219/10.81, 10.75, 10.77, 10.53, 501

[56] References Cited

U.S. PATENT DOCUMENTS

| | | | |
|---|---|---|---|
| 2,401,991 | 6/1946 | Walton et al. | 219/10.53 |
| 2,470,443 | 5/1949 | Mittelmann | 219/10.77 |
| 2,504,955 | 4/1950 | Atwood | 318/650 |
| 2,517,948 | 8/1950 | Warren | 219/10.77 |
| 2,593,959 | 4/1952 | Anderson et al. | 219/10.75 |
| 2,623,176 | 12/1952 | Witsenburg et al. | 219/10.75 |
| 2,747,646 | 5/1956 | Lippman | 219/10.75 |
| 2,810,793 | 10/1957 | Bruene | 318/650 |
| 3,742,180 | 6/1973 | Bradley | 219/10.81 |
| 3,845,269 | 10/1974 | Bradley | 219/10.81 |

*Primary Examiner*—B. A. Reynolds
*Assistant Examiner*—Philip H. Leung
*Attorney, Agent, or Firm*—Donald N. Halgren; Richard B. Megley; Vincent A. White

[57] ABSTRACT

An apparatus for applying pressure and a high frequency electric field to material, comprising a cavity for containing the electric field which encloses platens relatively movable to apply pressure to material placed between the platens. The cavity electrically communicates with the platens for supplying the contained electric field to the platens which, in turn, cooperate with each other to apply the field to the material between the platens. The cavity and the platens are also directly coupled into the means for generating the electric field as a resonant circuit. The apparatus includes a triode tube having means for preventing excessive current therethrough as voltage is first applied, and means for operating the triode under optimum conditions utilizing an automatically variable capacitor to maintain a predetermined grid current for a workpiece placed within the apparatus after full voltage has been applied.

4 Claims, 1 Drawing Figure

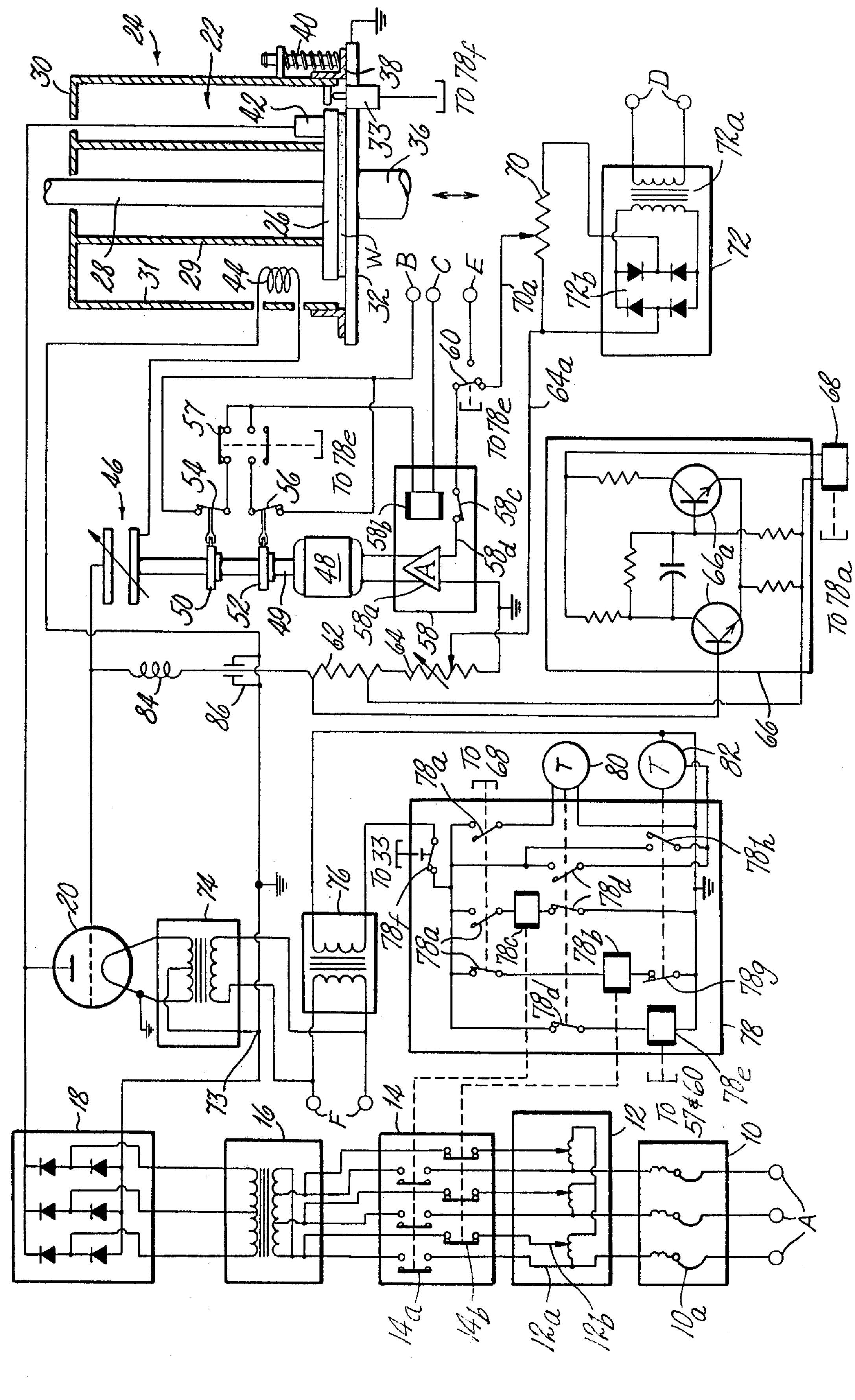

HIGH FREQUENCY CAVITY PRESS

CROSS-REFERENCE TO RELATED APPLICATION

This is a continuation-in-part of continuation application Ser. No. 767,773, filed Feb. 11, 1977 which was a continuation application of the parent application U.S. Ser. No. 638,331, filed on Dec. 8, 1975, both abandoned in my name.

BACKGROUND OF THE INVENTION

1. Field of the Invention

This invention is related to apparatus utilized in performing high frequency welding operations on workpieces.

2. Description of the Prior Art

The term "high frequency operation" where used herein is to be understood as referring to an operation in which a workpiece is heated by the application of a high frequency electric field. Examples of such operations are:

1. A "welding" operation: where a workpiece comprises an assembly formed by two or more layers, the assembly is welded using a suitably shaped tool under conditions of heat and pressure. In carrying out such a welding operation, if the layers of the assembly are of thermoplastics material, they are inherently weldable but, if the layers are not of thermoplastics material, the assembly may also comprise a layer of heat-activatable adhesive sandwiched between the other layers, which adhesive acts to "weld" the other layers together. If, for example, an overall weld is required, the tool may be a flat plate. If, on the other hand, welding is only required in specific areas, then the tool may be in the form of a die having blade portions defining said area.

2. An "embossing" operation: the surface of a workpiece, whether the workpiece comprises one or more layers, is embossed, that, is, provided with a decorative pattern, using a pattern-carrying tool under conditions of heat and pressure. In such an operation, the surface of the workpiece is rendered plastic by the effect of the heat thereon so that the pattern of the tool can be impressed thereon.

3. An operation in which a workpiece comprising an assembly formed of two or more layers is both welded and embossed by the use of a suitable tool under conditions of heat and pressure.

An apparatus which comprises means for generating a high frequency field and means for pressing a workpiece while a high frequency operation is being performed thereon is generally known as a high frequency welding machine. High frequency welding machines which are presently in use are usually comprised of a high frequency generator comprising a triode tube and a resonant cavity coupled to a press having platens which apply pressure to a workpiece in carrying out a high frequency operation and act as electrodes for applying a high frequency field formed from high frequency energy supplied to the press by the generator to the workpiece. In this kind of machine, the platens act like aerials and emit stray radiation which may cause interference with radio communication. To avoid any such interference, it is necessary that such a machine should operate at a frequency of 27.12+0.6% MHz., which frequency range is reserved for industrial machinery. This limitation on frequency makes it necessary to use a tuning capacitor to adjust the operating frequency of the machine for each different workpiece.

A machine of the above type suffers from two separate disadvantages. First, the need to tune the machine for different workpieces is time-consuming. Second, the triode tube of such a machine is rarely used under optimum working conditions, as recommended by the manufacturers. This is because the working conditions of the tube are altered from workpiece to workpiece. This shortens the life of the expensive tube.

U.S. Pat. No. 3,742,180, assigned to the assignee of the present invention, overcomes some of the disadvantages cited above wherein press platens are incorporated in the resonant cavity of the generator to operate upon the workpiece. The likelihood of interference is reduced since the radiation is contained within the resonant cavity and there is no need to operate at a specific frequency. The machine can operate at a natural frequency, which natural frequency is dependent on the nature of the workpiece. However, this machine has the disadvantage that, when power is applied to its triode tube, the initial current through the tube may exceed that which the tube can sustain without damage. This may occur before a high frequency field is built up in the resonant cavity so that virtually the entire current flow is through the tube.

It is one of the various objects of the present invention to provide an apparatus for performing high frequency operations on workpieces comprising means for insuring that, despite differing workpieces, a triode tube of the apparatus operates substantially under optimum conditions during operation of the apparatus.

It is another object of the present invention to provide means for protecting a triode tube of the apparatus from suffering an excessive initial current flow therethrough.

BRIEF SUMMARY OF THE INVENTION

The illustrative apparatus comprises a resonant cavity and an upper and a lower platen by which pressure may be applied to a workpiece enclosed in the resonant cavity. The apparatus is, therefore, similar, except as hereinafter described, to the apparatus described in the aforementioned U.S. Pat. No. 3,742,180.

The invention is also applicable to a high frequency generator whether or not said generator is coupled to a press to form a high frequency welding machine.

The apparatus also comprises a triode tube, the anode of which tube is connected to the interior of the resonant cavity. A variable tuning capacitor is connected between the grid of the tube and a feedback coil of the apparatus contained in the resonant cavity. The variable tuning capacitor does not control the frequency at which the apparatus operates. That frequency is dependent upon the nature of the workpiece being operated upon. The variable tuning capacitor acts to "tune" the grid current off the triode tube to a particular current.

The apparatus also comprises voltage applying means for applying a first, lower, DC voltage or a second, higher, DC voltage to the triode tube. This comprises transformer means and a rectifier. The transformer means comprises an auto transformer, a contact box, a rectifier, a transformer in the form of a relay and switching means. In the operation of the machine, the auto transformer operates to supply main voltage and a proportion of mains voltage to the contact box. A first and a second set of contacts in the contact box are operated by the relay to pass either the full mains voltage or a proportion thereof to the transformer. The transformer steps up the voltage passed thereto and applies its output to the rectifier. When the proportion of mains voltage is passed to the transformer, the rectifier applies said first, lower, voltage to the triode tube and, when the full mains voltage is passed to the transformer, the rectifier applies said second, higher voltage to the triode tube.

The apparatus further comprising operating means for varying the variable tuning capacitor increasing the capacitance thereof while said first voltage is applied to the tube, thereby causing feedback to the grid of the triode tube from the feedback coil to increase the grid current to the tube and to cause a high frequency field thus to be built up in the resonant cavity. The operating means comprises a servomotor, operable to move one plate of the variable tuning capacitor relative to the other. An amplifier is arranged to supply power to the servomotor in response to signals received from signaling means of the apparatus. The amplifier constitutes supply means for supplying power to said motor to cause it to increase the capacitance of the capacitor.

The aforementioned switching means of the apparatus is operable upon the grid current of the triode tube attaining a predetermined value to replace the aforementioned proportion of mains voltage supplied to the transformer by the full mains voltage. This causes the rectifier to replace said first, lower, DC voltage applied to the triode tube by the said second, higher, DC voltage. Thus, the second voltage is not applied to the tube until a high frequency field has been built up in the resonant cavity.

The triode tube of the apparatus is protected from suffering an excessive initial current flow therethrough by the arrangement whereby a lower voltage is first applied to the tube; only after a high frequency field has built up in the resonant cavity is a higher voltage applied.

The operating means of the apparatus is also arranged to vary the variable tuning capacitor during the operation of the apparatus. The signaling means of the apparatus is sensitive to changes in the grid current of the triode tube and causes said operating means to vary the capacitor so as to bring the grid current to a predetermined value approximating to the value required for optimum working conditions for the tube and thereafter to return the current to said value should it deviate therefrom.

The signaling means comprises a resistor which is subjected to a voltage, which is proportional to the grid current, and a reference voltage. A difference between these two voltages causes a signal to be passed to the amplifier of the operating means which then causes the servomotor to operate. The signaling means and the operating means together form means for insuring that, despite differing workpieces which alter the grid current obtained for a given value of the capacitance of the capacitor, the triode tube operates substantially upon optimum conditions during operation of the apparatus.

BRIEF DESCRIPTION OF THE DRAWING

The various objects and advantages of the invention will become more clear from the following detailed description to be read with reference to the accompanying drawing, which is a diagrammatic view of the circuitry of the present invention.

DESCRIPTION OF THE PREFERRED EMBODIMENT

The present invention is similar to the apparatus described in the aforementioned U.S. Pat. No. 3,742,180 in that it avoids stray radiation by containing the workpiece within a resonant cavity and is suitable for use in performing high frequency operations on workpieces.

The apparatus receives its power input from a three phase AC mains supply which is connected to three contacts A (shown diagrammatically as circles) on a circuit breaker 10 of the apparatus. The circuit breaker 10 comprises a set of contacts 10*a* which are arranged to be closed by an operator to pass current or to be opened when the apparatus is not in use. The contacts 10*a* will remain closed during a series of operations of the apparatus and will only be opened when the apparatus is to remain out of use for a long period e.g. overnight.

The circuit breaker 10 is connected to voltage applying means comprising an auto transformer 12, a contact box 14, a transformer 16, and a rectifier 18. The circuit breaker 10 is connected directly to the auto transformer 12 and, when the contacts 10*a* are closed, the circuit breaker 10 passes the mains voltage to the auto transformer 12. The auto transformer 12 passes the full mains voltage to the contact box 14 along tappings 12*a* and 40% of the full mains voltage to the contact box 14 along tappings 12*b*.

The tappings 12*a* are connected to a first set of contacts 14*a* in the contact box 14 and the tappings 12*b* are connected to a second set of contacts 14*b* in the contact box 14. When the contacts 14*a* are closed, the contacts 14*b* being open, the contact box 14 passes the full mains voltage to the transformer 16. When the contacts 14*a* are open and the contacts 14*b* are closed, the contact box 14 passes 40% of the full mains voltage to the transformer 16.

The transformer 16 steps up the voltage it receives and passes it to the rectifier 18. The transformer 16 will therefore either pass a high voltage to the rectifier 18 of 40% of this voltage. The rectifier 18 converts the voltage it receives to a D.C. output which is 5 kilovolts, when the high voltage is passed to the rectifier 18, and 2 kilovolts when 40% of the high voltage is received by the rectifier 18. The voltage applying means can thus apply either a first, lower, voltage of 2 kilovolts or a second, higher, voltge of 5 kilovolts.

The output of the voltage applying means is applied to a triode tube 20, the anode of which tube is connected to the "live " line of the rectifier 18's output. The tube 20 is a Mullard YD 1170 whose optimum conditions of operation require a grid current of 700 milliamps. The tube 20 forms an oscillator circuit with a resonant cavity generally designated 22. This oscillator circuit is arranged to oscillate at between 24 and 26 MHz., although the exact frequency is dependent on the workpiece being operated upon.

The resonant cavity 22 is defined by a fixed boxlike construction 24, mounted on a horizontal upper platen 26, and a horizontal lower platen 32. The upper platen depends from a fixed support rod 28 and the lower platen 32 is supported on a piston rod 36 of an hydraulic cylinder (not shown) so that it can be raised and lowered by operation of the hydraulic cylinder to open and close the cavity 22. The raising of the platen 32 also applies pressure to a workpiece on the platen 32, the workpiece being pressed between the two platens 26 and 32.

The construction 24 comprises an inner cylindrical sheet copper wall 29 which is mounted on the upper surface of the platen 26 and encircles the support rod 28, a rectangular sheet copper top piece 30 supported by an upper end portion of the wall 29, the support rod 28 passing through a closely fitting hole in the top piece 30, and sheet copper side walls 31 which depend from the edges of the top piece 30. The space inside the wall 29 through which the support rod 28 passes is not part of the cavity 22. A contact member 38 is mounted around the length of the lower edges of the walls 31 and is urged toward the lower platen 32 by springs 40, thus forming an effective electrical seal between the lower platen 32 and the walls 31 when the lower platen 32 is raised, thereby completing the cavity 22. The arrangement is such that a workpiece W, placed on the lower platen 32 is raised, upon operation of the hydraulic cylinder, to a position in which it is within the cavity 22 and is pressed between the upper and lower platens 26 and 32. A pressure switch 33 is associated with the lower platen 32 and is operated upon the cavity being closed and pressure being applied to the workpiece W between the platens 26 and 32.

A capacitor 42 is mounted within the cavity 22 on, and electrically connected with, a portion of the upper surface of the upper platen 26. This capacitor 42 is also connected to the anode of the tube 20 so that high frequency electrical energy can be supplied to the cavity 22 from the tube 20, creating a high frequency electrical field within the cavity 22. A feedback coil 44 is also contained within the cavity 22 and is connected between the "earth" line of the output of the rectifier 18 and the grid of the tube 20 via a variable tuning capacitor 46, which capacitor forms the variable tuning means of the apparatus. The tube 20 can thus receive feedback from the coil 44 when a high frequency electric field exists in the cavity 22.

The variable tuning capacitor 46, although shown diagrammatically in the drawing as having two parallel plates, in fact has two plates, each of which is constructed in the form of a series of semicircular vanes in the well-known manner. One of these plates is mounted to be rotated about a central axis of the capacitor, which rotation brings the vanes of one plate into or out of overlapping relationship with the vanes of the other plate, thus varying the capacitance of the capacitor 46. This rotation is brought about by operating means in the form of a servomotor 48 havng an output shaft 49 which is coupled to the rotatable plate.

The output shaft 49 of the motor 48 has two cams 50 and 52 mounted thereon which are rotated with the rotatable plate of the capacitor 46. The cam 50 is arranged to operate a microswitch 54 and the cam 52 is arranged to operate a microswitch 56. These microswitches are both connected to a relay-operated switch 57 which acts, in a manner described below, to switch in one of the microswitches 54 and 56 and to switch out the other of these microswitches.

The motor 48 operates to rotate the rotatable plate of the capacitor 46 when it receives an input from an amplifier arrangement 58. The amplifier arrangement 58 comprises an amplifier 58*a* which is arranged, when it receives a D.C. input on a line 58*d*, to operate the motor 48. The amplifier 58*a* is also connected to an earth line. If the signal on the line 58*d* is negative the motor 48 is operated to increase the capacitance of the capacitor 46 or, if the signal on the line 58*d* is positive, the motor 48 is operated to decrease the capacitance of the capacitor 46. The line 58*d* is connected through a relay-operated switch 58*c* to a switch 60. The switch 60 is also connected to a contact E.

The amplifier arrangement 58 also comprises a relay 58*b* which operates the switch 58*c*. When the relay 58*b* is energized, the switch 58*c* is closed allowing the supply on the line 58*d* to reach the amplifier 58*a* but, when the relay 58*b* is not energized, the switch 58*c* is open and the amplifier 58*a* is prevented from operating the motor 48. The relay 58*b* has two supply lines connected thereto. One of the supply lines originates at a contact B and the other supply line originates at a contact C. An A.C. supply is connected to the contacts B and C which may be tapped off the transformer 12. The line from the contact B to the relay 58*b* divides into two branches, one of which is connected to the microswitch 54 and the other of which is connected to the microswitch 56; the two branches of the line are reunited after passing the switch 57 and are connected to the relay 58*b*. The relay 58*b* thus only receives a supply when one of the microswitches 54 and 56 is closed and that microswitch is switched in by the switch 57. When the relay 58*b* receives a supply from the contacts B and C, it thus closes the switch 58*c* allowing the amplifier 58*a* to cause the motor 48 to operate to vary the capacitance of the capacitor 46 in response to signals received on the line 58*d*.

In the operation of the apparatus, the microswitch 54 will be opened by the cam 50 when the value of the capacitance of the capacitor 46 reaches a predetermined "overshoot" value which it is undesirable to exceed. Thus, if the microswitch 54 is opened, when it is connected to the relay 58*b* through the switch 57, the relay 58*b* will be de-energized and the switch 58*c* will open preventing further operation of the motor 48 and further increase in the capacitance. The microswitch 56 will be opened by the cam 52 when the value of the capacitance of the capacitor 46 reaches a low predetermined "datum" value at which it waits between operations of the apparatus. Thus, if the microswitch 56 is opened, when it is connected to the relay 58*b* through the switch 57, the relay 58*b* will be de-energized and the switch 58*c* will open preventing further operation of the motor 48 so that the value of the capacitance remains at the datum value.

The contact E receives a positive D.C. supply. The switch 60 can connect the line 58*d* to the contact E in which case, when the switch 58*c* is closed, the value of the capacitance of the capacitor 46 is decreased because the amplifier 58*a* receives a positive supply from the contact E. When the "datum" value is reached, the switch 58*c* opens and the motor 48 stops. The switch 60 alternatively connects the line 58*d* to a signal line 70*a* in which case, when the switch 58*c* is closed, the value of the capacitance is increased or decreased depending on whether the line 70*a* carries a positive or a negative supply.

A branch line is connected to the line which connects the capacitor 46 to the grid of the tube 20. This branch line runs to a resistor 62. This resistor 62 is connected in series with a second resistor 64 which is also connected to the "earth" line connected to the amplifier 58*a*. A current sensor 66 is connected across the resistor 62 so that it is able to sense the grid current of the tube 20. The current sensor 66 comprises a Schmitt trigger comprising two transistors 66*a*. The arrangement of the current sensor 66 is such that, when the grid current through the resistor 62 reaches 200 milliamps, the sensor 66 energizes a relay 68. The relay 68 acts as switching means of the aforementioned voltage applying means and is thus operable upon the grid current reaching 200 milliamps.

The relay 68, when energized, causes the first set of contacts 14*a* in the contact box 14 to close whilst, simultaneously, the second set of contacts 14*b* in the contact box 14 are opened. The relay 68 achieves this by operating contacts 78*a* in a relay box 78 to be described. Energization of the relay 68 thus causes the power input from the rectifier 18 to the tube 20 to be increased from 2 kilovolts to 5 kilovolts. The contacts 78*a* also operate a timer 80 in a manner described below.

The resistor 64 also has a connection to a line 64*a* which is connected to a resistor 70 and passes to the resistor 70 a proportion of the voltage across the resistor 64, which voltage is proportional to the grid current of the tube 20. The resistor 70 also receives a reference D.C. voltage from a transformer and rectifier 72, which transformer and rectifier 72 receives its input from two contacts D. The transformer and rectifier 72 receives an A.C. input from the contacts D, steps down this input on a transformer 72*a* and converts it to a D.C. output by means of a rectifier 72*b*. The resistor 70 thus receives the difference between the reference voltage from the transformer and rectifier 72 and the voltage received from the resistor 64 which is proportional to the grid current.

The signal line 70*a* aforementioned connects a contact on the resistor 70 to the switch 60. The arrangement is thus such that, if the grid current of the tube 20 is low, the voltage on line 64*a* will be less than the reference voltage from the transformer and rectifier 72 and the signal line 70*a* will carry a negative supply. If the grid current is high, the signal line 70*a* will carry a positive supply and, if the grid current is 700 milliamps, the voltages will balance and the signal line 70*a* will carry no supply. The supply on the line 70*a* is passed through switches 60 and 58*c* to the amplifier 58*a* which drives the motor 48 to vary the capacitance of the capacitor 46 until the grid current is 700 milliamps.

The cathode of the tube 20 is heated by a transformer 74 which receives its input through contacts F which receive an A.C. supply tapped off from the transformer 12; a transformer 76 also receives its input through the contacts F. This transformer 76 powers the aforementioned relay box 78. The relay box 78 has two timers 80 and 82 associated therewith. The relay box 78 contains the aforementioned set of contacts 78*a* which are operated by the relay 68. When the relay 68 is not energized, the contacts 78*a* pass power from the transformer 76 to a relay 78*b* which, when energized, closes the contacts 14*b* in the contact box 14. The contacts 78*a* also at this time prevent power from reaching a relay 78*c* and the timer 80. The relay 78*c* is arranged to close the contacts 14*a*, when energized, and the timer 80 operates a set of contacts 78*d*. Until the timer 80 times out, the contacts 78*d* keep the relay 78*c* connected into the circuit, pass power to a relay 78*e*, and prevent power from reaching the timer 82.

When the relay 68 is energized, the contacts 78*a* switch to a condition in which they switch out the relay 78*b* but switch in the relay 78*c* and the timer 80. After a predetermined time, the timer 80 times out causing the contacts 78*d* to switch out the relay 78*c* and the relay 78*e* but switch in the timer 82. The relay 78*e* operates the switches 60 and 57. When the relay 78*e* is energized the switch 57 switches in the microswitch 54 and the switch 60 is connected to the signal line 70*a*.

A switch 78*f* operated by the pressure switch 33 is arranged to cut off the power supply to the relay box 78 unless the pressure switch 33 is made.

A switch 78*g* is in series with the relay 78*b* and is operated by the timer 82 as is a switch 78*h* which acts to switch in the timer 82.

The operation of the relay box 78 is as follows. When the cavity 22 is closed, the pressure switch 33 closes the switch 78*f*. On the switch 78*f* closing, the relays 78*b* and 78*e* are energized, operating the contacts 14*b* and the switches 57 and 60. Next, the relay 68 operates the contacts 78*a* de-energizing the relay 78*b* and energizing the relay 78*c* and the timer 80, thereby opening the contacts 14*b* and closing the contacts 14*a*. When the timer 80 times out, it operates the contacts 78*d*, de-energizing the relays 78*c* and 78*e* and energizing the timer 82, thereby opening the contacts 14*a*, and operating the switches 57 and 60. Energization of the timer 82 operates the contacts 78*g* and 78*h*, locking in the timer 82 and switching out the relay 78*b*. Next, the relay 68 is de-energized, as a result of the fall of the grid current, and the contacts 78*a* return to their first position switching out the timer 80 so that the contacts 78*d* return to their first position and keeping the relay 78*c* out. When the timer 82 times out, the switch 78*g* closes and the switch 78*h* opens.

The apparatus also comprises various chokes, for instance, that shown at 84, and high frequency suppressors, for instance, that shown at 86. The chokes and suppressors, other than 84 and 86, have been omitted from the drawing in the interest of clarity.

If the high frequency operation involves embossing or localized welding, a die may be mounted on the lower platen 32 or may be placed on top of the workpiece W.

At the beginning of a series of operations of the apparatus, the operator closes the contacts 10*a* so that mains voltage is supplied to the auto transformer 12. The apparatus is now in a condition in which the cavity 22 is open. The contacts 14*a* and 14*b* are open, the switch 57 is switching in the microswitch 56 which is open, the switch 60 is connecting the contact E to the switch 58*c* which is open, and the switch 78*f* is open. At this stage, the capacitor 46 is at its "datum" value so that the cam 52 holds the microswitch 56 open.

When the operator has positioned the workpiece W on the lower platen 32, he causes the aforementioned hydraulic cylinder to operate so that the platen 32 is raised closing the cavity 22. When the cavity 22 is closed and pressure is thus applied to the workpiece W, the pressure switch 33 is operated closing the switch 78*f*. The closing of the switch 78*f* causes the contacts 78*a* to pass power to the relay 78*b* and the contacts 78*d* to pass power to the relay 78*e*. The energization of the relay 78*b* causes the contacts 14*b* in the contact box 14 to be closed and the energization of the relay 78*e* causes the switch 57 to switch out the microswitch 56 and switch in the microswitch 54, which is closed, and also causes the switch 60 to connect the signal line 70*a* to the switch 58*c*. The relay 58*b* is now energized, since power reaches it through the microswitch 54 and the switch 57, so that the switch 58*c* closes.

The apparatus has now reached the condition shown in the drawing. The contacts 14*b* being closed causes the rectifier 18 to apply 2 kilovolts to the tube 20. The amplifier 58*a* is now receiving a negative signal on the line **58*d* because the grid current has not yet built up and the reference voltage from the transformer and rectifier 72 is not balanced. The negative signal to the amplifier 58*a* causes it to cause the motor 48 to raise the capacitance of the capacitor 46 away from the "datum" value allowing a high frequency field to build up in the cavity 22. At this stage, the tube 20** is able to dissipate the anode power without sustaining damage.

The motor 48 continues to increase the capacitance of the capacitor 46, allowing the high frequency field to build up in the cavity 22 and thus the grid current of the tube 20 to increase. When the grid current reaches 200 milliamps the relay 68 becomes energized and causes operation of the contacts **78*a* in the relay box 78. The contacts 78*a* now switch out the relay 78*b* so that the contacts 14*b* open removing the 2 kilovolt supply to the tube 20. The contacts 78*a* also now switch in the relay 78*c* and the timer 80. The relay 78*c* is now energized and the contacts 14*a* close applying the 5 kilovolt supply to the tube 20. The effect of the energization of the relay 68 is thus to replace the 2 kilovolt supply to the tube 20 by the 5 kilovolt supply. The timer 80** has now started to time the period for which the workpiece W is subjected to the high frequency field.

At this stage, the reference voltage from the transformer and rectifier 72 is still not balanced by the voltage on the line **64*a* so that the amplifier 58*a* is still causing the motor 48 to increase the capacitance of the capacitor 46 building up the high frequency field and the grid current. When the input to the tube 20 is increased from 2 to 5 kilovolts, the tube 20 is able to sustain the additional power applied thereto without damage because the grid current is already flowing diverting a considerable proportion of the power applied. Were 5 kilovolts to be applied, when no grid current was flowing, the tube 20** would sustain damage.

When the grid current reaches 700 milliamps, the voltage on the line **64*a* balances the reference voltage from the transformer and rectifier 72 and the amplifier 58*a* no longer receives a supply on the line 70*a* and the motor 48 stops. The capacitance of the capacitor 46 now remains constant unless the grid current deviates from 700 milliamps, in which case the amplifier 58*a* will receive a negative signal, if the grid current has dropped, and a positive signal, if the grid current has risen, and will operate the motor in the appropriate direction to return the grid current to 700 milliamps. The grid current is, thus, automatically adjusted to 700 milliamps ensuring maximum life for the tube 20**.

If, because a totally unsuitable workpiece has been placed in the cavity 22 or for any other reason, the capacitance of the capacitor 46 cannot be raised sufficiently to bring the grid current to 700 milliamps, the capacitance is held at its maximum value, i.e. with full overlap of the plates of the capacitor 46. This is achieved by the arrangement that, when the maximum value is reached which occurs at full overlap of the plates the cam 50 opens the microswitch 54 so that the relay **58*b* is de-energized and the switch 58*c* opens so that the amplifier 58*a* receives no supply and the motor 48 ceases to operate. This precaution prevents the rotatable plate of the capacitor 46 from being turned past the position corresponding to the maximum capacitance and on to a lower capacitance which would reduce the feedback to the grid of the tube 20 and allow the grid current to fall, possibly damaging the tube 20. The cam 50 and the microswitch 54** thus constitute holding means arranged to maintain the grid current at the maximum value attained if the grid current fails to reach 700 milliamps.

When the time allowed by the timer 80 has been completed, the timer 80 times out operating the contacts **78*d*. The contacts 78*d* de-energize the relays 78*c* and 78*e* and energize the timer 82. Energization of the timer 82 opens the switch 78*g*, keeping the relay 78*b* switched out, and closes the switch 78*h* locking in the timer 82. De-energization of the relay 78*c* causes the contacts 14*a* to open removing the 5 kilovolt supply from the tube 20. De-energization of the relay 78*e* causes operation of the switches 57 and 60. The switch 57 now switches in the microswitch 56 which is closed, since the capacitance of the capacitor 46 is not at its "datum" value. The supply to the relay 58*b* is now through the microswitch 56 and the switch 58*c* remains closed. The switch 60 now connects the switch 58*c* with the contact E and the amplifier 58*a* receives a positive supply and causes the capacitance of the capacitor 46 to be reduced until the "datum" value is reached. At the "datum" value, the cam 52 opens the microswitch 56 de-energizing the relay 58*b* and opening the switch 58*c*. The amplifier 58*a* now receives no supply and the motor 48 stops. Removal of the 5 kilovolt supply causes the high frequency field to cease and the grid current to fall to zero whereupon the relay 68 is de-energized and the contacts 78*a* are operated. The timer 80 is now de-energized and the contacts 78*d* return to their first position, the timer 82 still being switched in by switch 78*h***.

The timer 82 allows a period after the high frequency field has ceased during which the workpiece W is kept under pressure. When the timer 82 times out, the cavity 22 is opened releasing the pressure switch 33 and opening the switch **78*f*. The switch 78*f* acts as a safety switch preventing operation of the relay box 78 unless the cavity 22 is closed. Timing out of the timer 82 also opens the switch 78*h* and closes the switch 78*g***. The apparatus has now returned to its starting condition.

The apparatus has its triode valve protected from suffering an excessive initial current flow therethrough by the arrangement whereby the higher voltage is not applied to the valve until a high frequency field has built up in the resonant cavity. The tube is also operated under substantially optimum conditions so that its life is extended.

Having thus described our invention, what we claim as new and desire to secure as Letters Patent of the United States is:

1. An apparatus for applying a high frequency electric field and pressure on workpieces comprising:
   - a resonant cavity wherein the workpiece on which a high frequency operation is to be performed can be enclosed and pressure can be applied by an arrangement of platen members;
   - a triode tube having an anode which is connected to the interior of said resonant cavity;
   - a variable tuning means connected between a grid on said tube and a feedback coil contained within said resonant cavity;
   - a voltage applying means for applying a first, lower, voltage, or a second, higher, voltage to said tube;
   - operating means for varying said variable tuning means while said first voltage is applied to said tube, thereby causing the grid current of said tube to increase and a high frequency field to be built up in said resonant cavity, said voltage applying means comprising switching means operable upon the grid current attaining a predetermined value to replace said first voltage by said second voltage;

signaling means sensitive to changes in the grid current of said tube for causing said operating means after said second voltage has been applied to said tube to vary said variable tuning means so as to bring the grid current to a second predetermined value and thereafter to return the grid current to said value should it deviate therefrom;

holding means arranged to maintain the grid current at the maximum value attained should the grid current fail to attain the second predetermined value;

a relay operable to switch from the first to the second voltage in response to a current sensor arranged to sense the grid current of said tube;

a timing means arranged to switch off the high frequency field in said resonant cavity after a predetermined time interval; and a second timing means which is arranged to release the pressure on said workpiece after a further predetermined time interval.

2. An apparatus for applying a high frequency electric field and pressure on workpieces as recited in claim 1, wherein said variable tuning means comprises a variable tuning capacitor.

3. An apparatus for applying a high frequency electric field and pressure on workpieces as recited in claim 1, wherein said operating means comprises a motor coupled to a movable plate of said variable capacitor, said motor being operable to move said variable plate, thereby varying the capacitance of said capacitor.

4. An apparatus for applying a high frequency electric field and pressure on workpieces as recited in claim 1, wherein one of said platen members is arranged to be moved to complete said resonant cavity and to operate a pressure switch which causes a voltage to be applied to said tube.

* * * * *